Jan. 19, 1943. H. C. WELLER 2,308,902
METHOD OF PRODUCING A HEAT RADIATING FLAME
Filed July 25, 1941
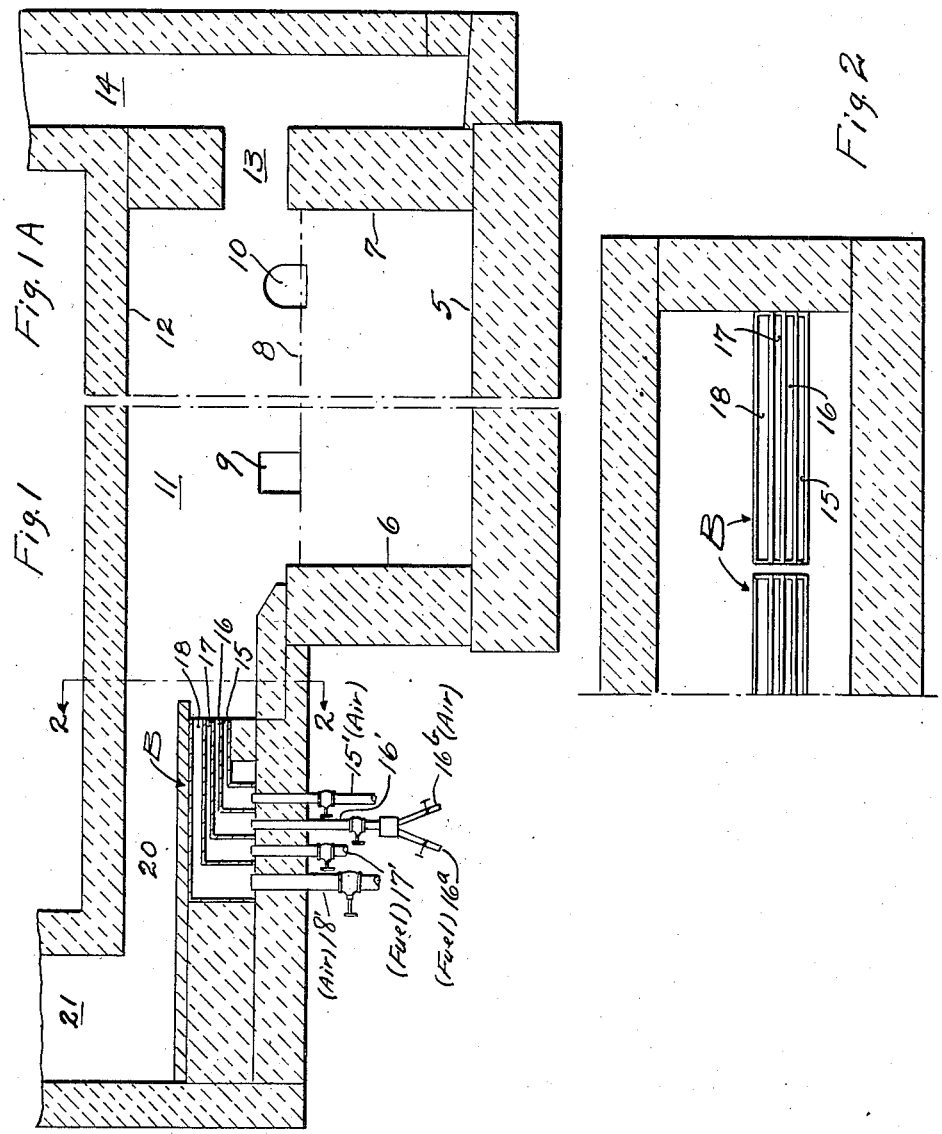
Inventor
H. C. Weller
By Charles A. Lind
Attorney Patented Jan. 19, 1943

2,308,902

UNITED STATES PATENT OFFICE 2,308,902

METHOD OF PRODUCING HEAT RADIATING FLAMES

Harvey C. Weller, Toledo, Ohio, assignor to General Properties Company, Inc., Toledo, Ohio, a corporation of Delaware Application July 25, 1941, Serial No. 404,071

2 Claims. (Cl. 263—52)

The present invention relates to improvements in methods of producing a relatively long heat radiating flame for heating material in relatively long industrial furnaces such as billet heating furnaces, glass melting furnaces and the like. Known methods of producing a heat radiating flame leave much to be desired in the way of control of the flame particularly as regards heat distribution and it is the primary object of the invention to provide for the production of a heat radiating flame in a manner to permit ready control of the flame both as regards heat distribution and length of the flame. Another object is to produce a heat radiating flame that shall be particularly well adapted for use in the melting and refining of glass.

The manner of producing the improved heat radiating flame can best be explained in connection with the accompanying drawing wherein Figs. 1 and 1A together constitute a more or less diagrammatic representation, in vertical longitudinal section, of a glass melting furnace and Fig. 2 is an enlarged view on line 2—2 of Fig. 1, the left-hand end of the view being at the center line of the furnace.

5 indicates the bottom and 6 and 7 the ends of a tank wherein the glass to be melted and refined is contained. 8 indicates the normal level of the bath; 9 the charging hole for raw material and 10 the hole through which the molten and refined glass is withdrawn from the tank. Above the tank is a combustion space or chamber 11, the roof of which is indicated at 12. Waste combustion gases flow from said chamber through a passage 13 which delivers to a flue 14 which will ordinarily deliver to a recuperator, not shown.

The means for producing the improved heat radiating flame of the present invention comprises a burner generally indicated at B, the burner being substantially as wide as the combustion chamber 11 and consisting essentially of a plurality of slot-type discharge passages 15 to 18 one above the other. As shown in Fig. 2, the burner may consist of individual units arranged side by side, thus facilitating construction and installation.

The method of producing the improved heat radiating flame of the present invention is as follows: Air is delivered to the lower and upper burner passages 15 and 18 by individual supply pipes 15' and 18' and fuel is delivered to the two intermediate burner passages 16 and 17 by individual supply pipes 16' and 17', the fuel ordinarily being natural gas with or without admixture with higher hydrocarbons. The air and fuel from the two lower burner passages 15 and 16 are flowed at substantially the same velocity, this velocity depending to some extent on the length of the combustion chamber but ordinarily being about seventeen feet per second. The fuel from the burner passage 17 is flowed at a velocity substantially greater (ordinarily not less than about one and one-half times greater) than the velocity of the fuel issuing from the next lower burner port 16 and air from the burner port 18 is flowed at a velocity substantially greater (ordinarily not less than one and one-half times greater) than the velocity of the fuel issuing from the next lower burner port 17. Combustion takes place at the plane of contact of the air and the gas streams and the fuel between the two zones or planes of combustion will become so highly heated as to become highly luminous and thereby constitute a source of radiant heat. In accordance with the present invention some air is admixed with the fuel which is supplied to the burner passage 16. The means for effecting such premixing is diagrammatically illustrated by the two separate feed pipes 16a and 16b which deliver to the pipe 16' which delivers to the passage 16. However, the maximum amount of air thus admixed with the fuel delivered to the passage 16 is substantially less than what would be required to propagate a flame at the prevailing temperature. To illustrate: Five volumes of air admixed with one of natural gas are just about enough to propagate a flame, that is to say, to maintain combustion once the mixture is ignited (it being understood that this amount of air is just about one-half of what is required to support complete combustion of the fuel) and would therefore be substantially in excess of the maximum contemplated by the present invention which is about three volumes of air to one of natural gas. By varying the amount of air within the stated maximum, it follows that the rate of combustion of the fuel issuing from the burner passage 16 can be controlled to a substantial degree. Inasmuch as the fuel issuing from the burner passage 17 is heated in part by the heat of combustion of the fuel issuing from the passage 16, it follows that by increasing the rate of combustion of the fuel from the passage 16, the fuel from passage 17 can be heated to a higher degree than would otherwise be the case.

It has already been stated that the air from the burner passage 18 and the fuel from the next adjacent passage 17 flow at substantially different velocities. This difference in velocity tends to produce relatively minute eddy currents at the plane of contact of the two streams with the result that combustion is accelerated due to more rapid intermixing of the fuel and air than would be the case if the streams were flowed at substantially the same velocity. The non-burning fuel is therefore heated to a higher degree than would otherwise be the case with the consequent production of a highly luminous flame. The cross sectional area of the air passage 18 is sufficiently greater than the fuel passage 17 to provide a sufficient volume of air for complete combustion of the fuel. The primary reason for flowing the fuel from the passage 17 at a greater velocity than the fuel from the passage 16 is to insure that there shall be flame coverage over substantially the entire length of the tank notwithstanding the accelerated rate at which the fuel is burned. The air admixed with the fuel from the passage 16 plus the air from the air passage 15 is enough to insure complete combustion of the fuel from the passage 16. A flame produced as described has been found to have special utility in connection with the melting and refining of glass in a tank but it will be understood that its utility is not limited to glass tank furnaces. Thus it is applicable to practically all types of relatively long heating furnaces such as billet heating furnaces, open hearth furnaces, etc. In cases where a stream of air next to the work is objectionable because of its oxidizing properties there may be flowed between the work and the stream of air a non-oxidizing gas from a separate passage below the air passage 15 as will be readily understood.

Above the burner B is an air passage to which air is delivered by a conduit 21 which will ordinarily lead from the recuperator (not shown) to which the waste gas flue 14 delivers (as previously explained). It will therefore be understood that the air supplied to the passage 20 is preheated. The velocity at which the air flows from the passage 20 is of more or less secondary importance but ordinarily will be about 20 ft. per second. By thus introducing a stream of preheated air for flow between the furnace roof 12 and the burner flame, the stream integrity of the flame will be maintained for a much greater distance than would otherwise be the case and the furnace roof will also be maintained relatively cool.

What I claim is:

1. The method of producing a heat radiating flame for heating material in a relatively long furnace having a roof a substantial distance above the top level of said material which comprises introducing into the furnace for flow between said roof and said level a relatively thin wide first stream of air, introducing into the furnace for flow next below said air stream a relatively thin wide stream of hydrocarbon fuel gas at a velocity substantially less than said air stream, introducing into the furnace for flow next below said fuel gas stream a relatively thin wide second stream of hydrocarbon fuel gas at a velocity substantially less than the first fuel gas stream, and introducing into the furnace for flow next below the second fuel gas stream a relatively thin wide stream of air, all of said streams being simultaneously introduced to flow in the same direction from one end of the furnace.

2. The method of producing a heat radiating flame for heating material in a relatively long furnace having a roof a substantial distance above the top level of the material which comprises introducing into the furnace for flow next to said roof a relatively thick wide stream of preheated air, introducing into said furnace for flow next adjacent said level a relatively thin wide stream of air, and introducing into the furnace for flow between said air streams two separate but contiguous relatively thin wide streams of hydrocarbon fuel gas of which the upper one has a velocity substantially greater than the lower one, all of said streams being simultaneously introduced to flow in the same direction from one end of the furnace.

HARVEY C. WELLER.